US008902258B2

(12) United States Patent (10) Patent No.: US 8,902,258 B2
Shanka et al. (45) Date of Patent: Dec. 2, 2014

(54) SYSTEMS AND METHODS FOR SYNCHRONOUS ZOOMING

(75) Inventors: Renu Narayan Shanka, Mumbai (IN); Vidya Abhijeet Argonda, Mumbai (IN); Sunil Narayan Desai, Mumbai (IN); Joseph Donald Robert, Reno, NV (US); John Steven Frederick, Wake Forest, NC (US)

(73) Assignee: General Electric Company, Schenectady, NY (US)

( * ) Notice: Subject to any disclaimer, the term of this patent is extended or adjusted under 35 U.S.C. 154(b) by 245 days.

(21) Appl. No.: 13/407,962

(22) Filed: Feb. 29, 2012

(65) Prior Publication Data

US 2013/0222420 A1 Aug. 29, 2013

(51) Int. Cl.
*G09G 5/00* (2006.01)
*G06T 11/20* (2006.01)

(52) U.S. Cl.
USPC ............ 345/660; 345/440; 345/629; 345/640

(58) Field of Classification Search
CPC ............ G06T 11/20; G06T 3/40; G09G 5/00; G09G 5/006; G09G 2320/0257; G09G 2340/045; G06F 3/0481; G06F 3/048; G06F 19/00; G06F 3/041; G06F 17/00; G06F 3/013; G06F 13/14; G06F 2203/04806; G01H 1/00; G01H 11/00; G01H 13/00; G01H 17/00; G01H 3/00; G01H 5/00

USPC ............ 345/629, 440, 440.2, 441, 649, 660; 700/108, 287; 290/7, 44, 52, 54; 702/33–84
See application file for complete search history.

(56) References Cited

U.S. PATENT DOCUMENTS

| 7,966,150 | B2 | 6/2011 | Smith et al. | |
|---|---|---|---|---|
| 7,987,725 | B2 | 8/2011 | Twerdochlib | |
| 2007/0109301 | A1* | 5/2007 | Smith | 345/440 |
| 2008/0120335 | A1* | 5/2008 | Dolgoff | 707/104.1 |
| 2009/0040238 | A1* | 2/2009 | Ito et al. | 345/660 |
| 2009/0147026 | A1* | 6/2009 | Buck et al. | 345/666 |
| 2010/0030493 | A1 | 2/2010 | Rao | |
| 2011/0049883 | A1 | 3/2011 | Hatch et al. | |
| 2011/0277535 | A1 | 11/2011 | Twerdochlib | |
| 2012/0316782 | A1* | 12/2012 | Sartipi et al. | 701/455 |
| 2013/0118183 | A1* | 5/2013 | Wang et al. | 60/783 |

* cited by examiner

*Primary Examiner* — Ryan R Yang
*Assistant Examiner* — Michael Le
(74) *Attorney, Agent, or Firm* — Fletcher Yoder, P.C.

(57) ABSTRACT

A system for displaying a plurality of plots is provided. The system includes a presentation interface configured to display the plurality of plots, a user input interface configured to create a zoom window on a selected plot of the plurality of plots, and a processing device configured to automatically determine, based on the created zoom window, a corresponding zoom window for each remaining plot of the plurality of plots, and display simultaneously, on the presentation interface, a zoomed-in area of the selected plot based on the created zoom window and a zoomed-in area of each of the remaining plots based on the corresponding zoom window for each of the remaining plots.

20 Claims, 7 Drawing Sheets

SYSTEMS AND METHODS FOR SYNCHRONOUS ZOOMING

BACKGROUND OF THE INVENTION

The subject matter disclosed herein relates generally to displaying data plots, and more specifically, to systems and methods for displaying a zoomed-in area of a plurality of data plots.

At least some known machines, such as gas turbines, include rotor assemblies. The rotor assemblies may exhibit vibrations or other behavior during operation. Sensors may be used to monitor such behavior to determine the operational status of one or more components. For example, sensors may measure an amount of vibration induced in a motor drive shaft, a rotational position or displacement of the motor drive shaft, and/or other operational characteristics of a machine or motor.

To monitor a health and/or operational state of gas turbines, data from such sensors may be recorded and analyzed by an operator. However, in at least some known data display systems, data from different sensors cannot be easily compared to determine the health and/or operational state of the gas turbine. Specifically, in at least some known data display systems, different plots of data are commonly displayed at different scales. Further, in at least some known data display systems, zooming in on a selected data plot only magnifies that particular plot, and accordingly, the magnified data cannot be easily compared with data in other, unmagnified data plots.

BRIEF DESCRIPTION OF THE INVENTION

In one aspect, a system for displaying a plurality of plots is provided. The system includes a presentation interface configured to display the plurality of plots, a user input interface configured to create a zoom window on a selected plot of the plurality of plots, and a processing device configured to determine automatically, based on the created zoom window, a corresponding zoom window for each remaining plot of the plurality of plots, and display simultaneously, on the presentation interface, a zoomed-in area of the selected plot based on the created zoom window and a zoomed-in area of each of the remaining plots based on the corresponding zoom window for each of the remaining plots.

In another aspect, a processing device is provided. The processing device is configured to display a plurality of plots on a presentation interface, determine, based on user input, a created zoom window on a selected plot of the plurality of plots, determine automatically, based on the created zoom window, a corresponding zoom window for each remaining plot of the plurality of plots, and display simultaneously, on the presentation interface, a zoomed-in area of the selected plot based on the created zoom window and a zoomed-in area of each of the remaining plots based on the corresponding zoom window for each of the remaining plots.

In yet another aspect, a method for displaying a plurality of plots is provided. The method includes displaying a plurality of plots on a presentation interface, determining, using a processing device, a created zoom window on a selected plot of the plurality of plots, determining automatically, using the processing device, based on the created zoom window, a corresponding zoom window for each remaining plot of the plurality of plots, and displaying simultaneously, on the presentation interface, a zoomed-in area of the selected plot based on the created zoom window and a zoomed-in area of each of the remaining plots based on the corresponding zoom window for each of the remaining plots.

DETAILED DESCRIPTION OF THE INVENTION

The systems and methods described herein enable a plurality of plots to be accurately and effectively displayed on a presentation interface. By creating a zoom window on a selected plot of the plurality of plots, a corresponding zoom window is automatically generated for each of the remaining plots. Using the created zoom window and the corresponding zoom windows, a zoomed-in area of the selected plot is displayed, as well as zoomed-in areas for each of the remaining plots. Simultaneously displaying a zoomed-in area for each of the plurality of plots on the presentation interface enables a user to quickly and easily compare data between the different plots.

Technical effects of the methods and systems described herein include at least one of: (a) displaying a plurality of plots; (b) determining a created zoom window on a selected plot of the plurality of plots; (c) determining automatically, based on the created zoom window, a corresponding zoom window for each remaining plot of the plurality of plots; and (d) displaying simultaneously a zoomed-in area of the selected plot based on the created zoom window and a zoomed-in area of each of the remaining plots based on the corresponding zoom window for each of the remaining plots.

Figure 1:
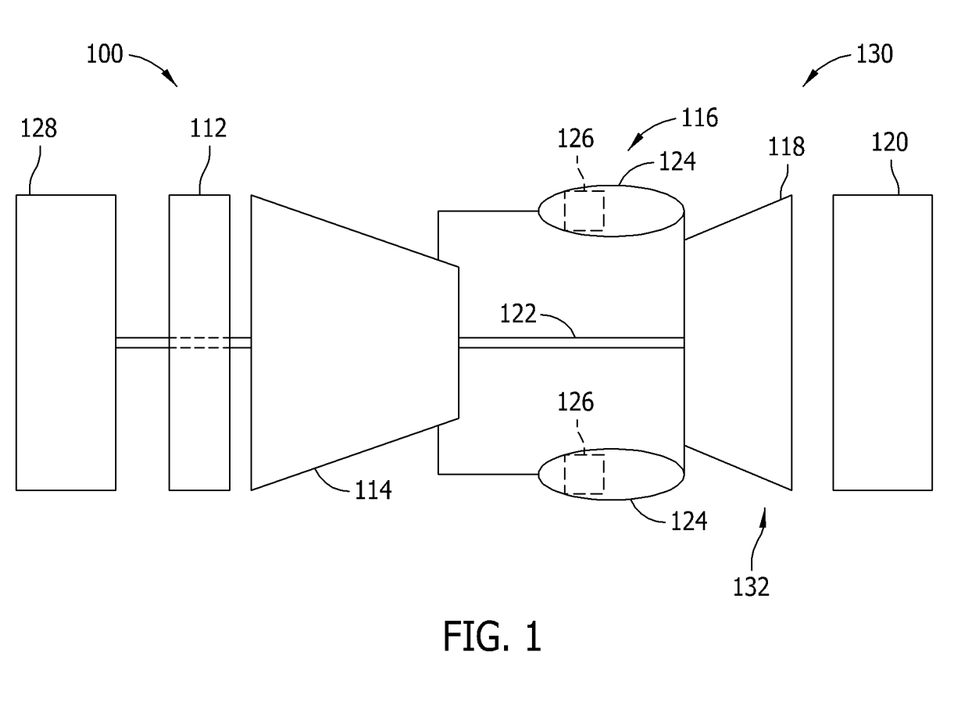
FIG. 1 is a schematic cross-sectional view of an exemplary turbine engine.
Figure 2:
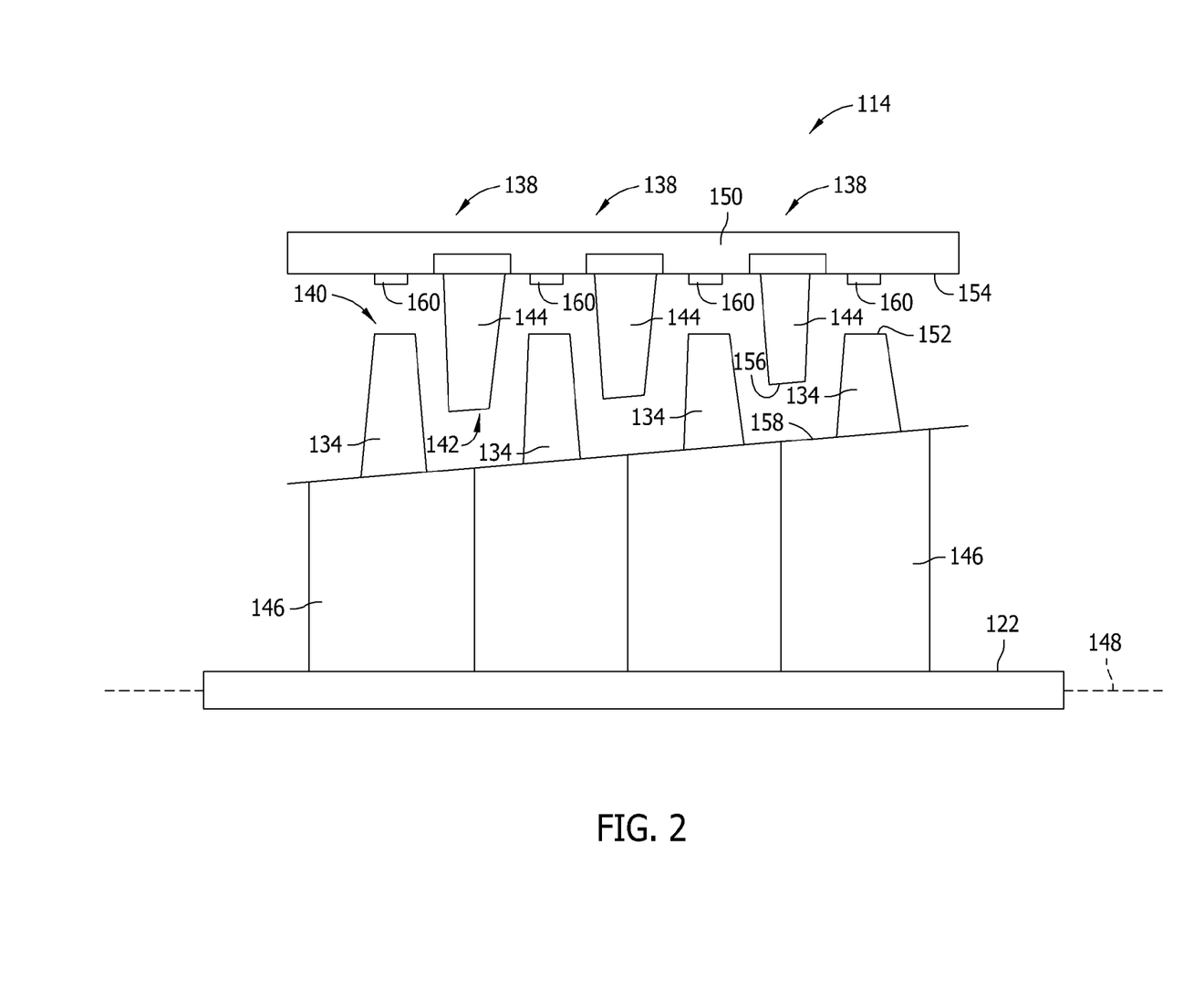
FIG. 2 is a schematic cross-sectional view of an exemplary compressor assembly that may be used with the turbine engine shown in FIG. 1.

FIG. 1 is a schematic cross-sectional view of an exemplary turbine engine 100. FIG. 2 is a schematic cross-sectional view of an exemplary compressor assembly 114 that may be used with turbine engine 100. In the exemplary embodiment, turbine engine 100 is a gas turbine engine. While the exemplary embodiment is directed towards a gas turbine engine, the systems and methods described herein are not limited to any one particular engine, and one of ordinary skill in the art will appreciate that the systems and methods described herein may be used in connection with other turbine engines and/or in applications unrelated to turbine engines.

In the exemplary embodiment, turbine engine 100 includes an intake section 112, compressor assembly 114 downstream from intake section 112, a combustor assembly 116 downstream from compressor assembly 114, a turbine assembly 118 downstream from combustor assembly 116, and an exhaust section 120. In the exemplary embodiment, turbine assembly 118 is coupled to compressor assembly 114 via a rotor shaft 122. In the exemplary embodiment, combustor assembly 116 includes a plurality of combustors 124. Combustor assembly 116 is coupled to compressor assembly 114 such that each combustor 124 is in flow communication with compressor assembly 114. A fuel injection assembly 126 is coupled within each combustor 124. Turbine assembly 118 is coupled to compressor assembly 114 and to a load 128 such as, but not limited to, an electrical generator and/or a mechanical drive application. In the exemplary embodiment, compressor assembly 114 and turbine assembly 118 each include at least one rotor disk assembly 130 that is coupled to a rotor shaft 122 to form a rotor assembly 132.

As shown in FIG. 2, Compressor assembly 114 includes at least one rotor blade or compressor blade 134 that is coupled to rotor shaft 122. In the exemplary embodiment, compressor assembly 114 includes a plurality of stages 138 that each include a row 140 of compressor blades 134 and a stationary row 142 of compressor vanes 144. In the exemplary embodiment, each stage 138 includes thirty-two compressor blades 134 that are spaced circumferentially about shaft 122. Alternatively, stage 138 includes any number of compressor blades 134 that enables compressor assembly 114 to function as described herein.

Each compressor blade 134 extends radially outwardly from a rotor disk 146. Each rotor disk 146 is coupled to rotor shaft 122 and rotates about a centerline axis 148. A compressor casing 150 extends circumferentially about rotor shaft 122 and compressor vanes 144. Each compressor vane 144 is coupled to casing 150 and extends radially inwardly from casing 150 towards rotor disk 146. Each compressor blade 134 extends outwardly towards casing 150 such that a tip end 152 of each blade 134 is spaced a radial clearance distance (not shown) from an inner surface 154 of casing 150. Similarly, each compressor vane 144 extends inwardly towards rotor disk 146 such that a tip end 156 of each compressor vane 144 is spaced a radial clearance distance (not shown) from a radially outer surface 158 of each rotor disk 146.

To monitor the operational state or health of compressor assembly 114, sensors 160 coupled to inner surface 154 monitor compressor blades 134. In the exemplary embodiment, sensors 160 are magnetic blade pass sensors, such as Hall Effect sensors. Alternatively sensors 160 are any type of detection device that enables turbine engine 100 to function as described herein.

During operation of compressor assembly 114, sensors 160 collect blade pass data. Specifically, in the absence of a compressor blade 134, each sensor 160 produces a steady voltage output as a signal. When a compressor blade 134 passes sensor 160, a pulse is generated in the voltage signal, and the height of the pulse is indicative of the distance between compressor blade 134 and sensor 160. Accordingly, sensors 160 sense each time a compressor blade 134 rotates past and measure the distance between compressor blade 134 and sensor 160 for each pass.

In the exemplary embodiment, sensors 160 in each stage 138 include at least a primary and secondary sensor that measure each time a compressor blade 134 passes. Sensors 160 also include a keyphasor sensor that generates a pulse for each complete revolution of stage 138. Accordingly, in an embodiment where stage 138 includes thirty-two compressor blades 134, for one revolution of stage 138, blade pass data from the primary and secondary sensors should include thirty-two pulses, and blade pass data from the keyphasor sensor should include one pulse.

Figure 3:
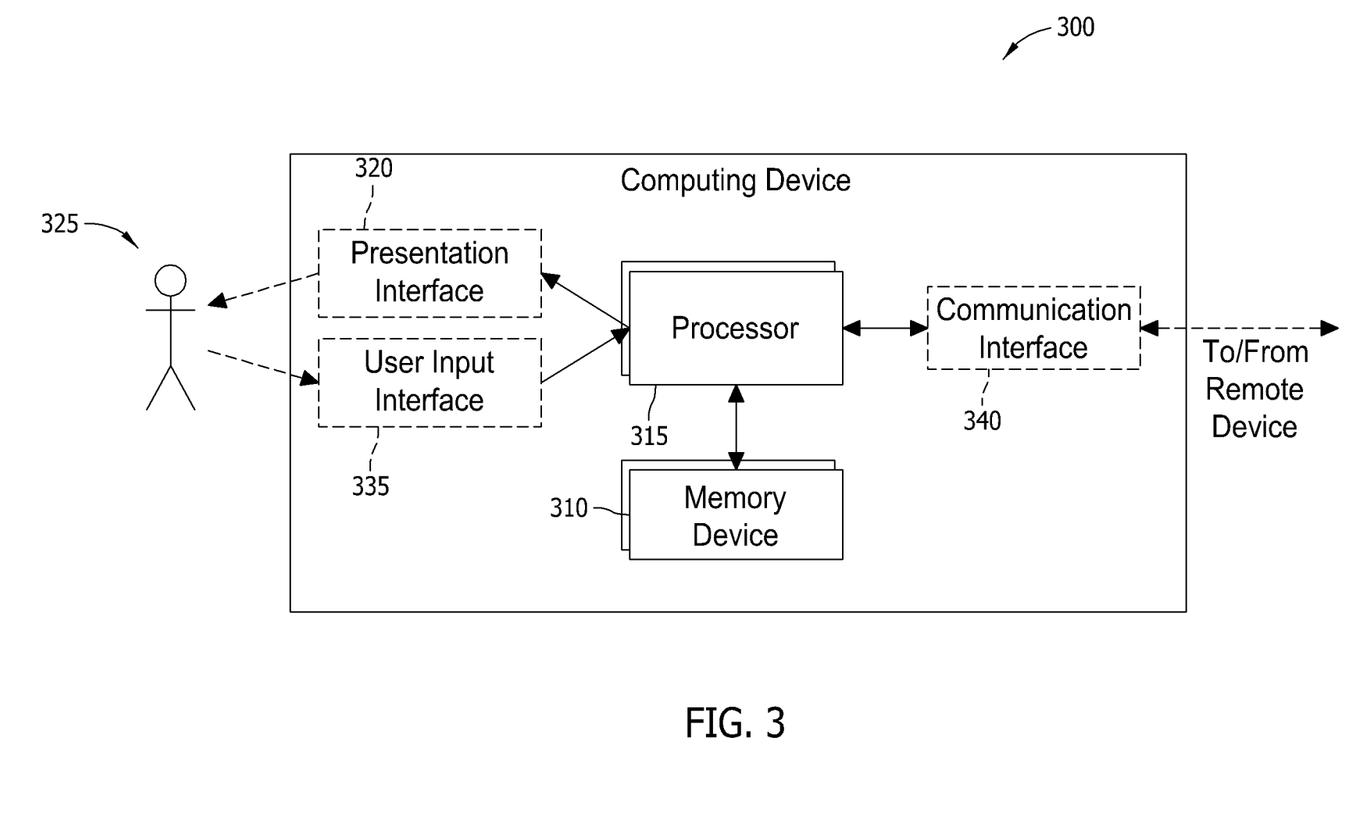
FIG. 3 is a block diagram of an exemplary computing device that may be used to analyze and present blade pass data from the compressor assembly shown in FIG. 2.

FIG. 3 is a block diagram of an exemplary computing device 300 that may be used to analyze and present blade pass data from a compressor assembly, such as compressor assembly 114. Computing device 300 includes at least one memory device 310 and a processor 315 that is coupled to memory device 310 for executing instructions. In some embodiments, executable instructions are stored in memory device 310. Computing device 300 performs one or more operations described herein by programming processor 315. For example, processor 315 may be programmed by encoding an operation as one or more executable instructions and by providing the executable instructions in memory device 310.

Processor 315 may include one or more processing units (e.g., in a multi-core configuration). Further, processor 315 may be implemented using one or more heterogeneous processor systems in which a main processor is present with secondary processors on a single chip. As another illustrative example, processor 315 may be a symmetric multi-processor system containing multiple processors of the same type. Further, processor 315 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein.

Memory device 310 is one or more devices that enable information such as executable instructions and/or other data to be stored and retrieved. Memory device 310 may include one or more computer readable media, such as, without limitation, dynamic random access memory (DRAM), static random access memory (SRAM), a solid state disk, and/or a hard disk. Memory device 310 may be configured to store, without limitation, application source code, application object code, source code portions of interest, object code portions of interest, configuration data, execution events and/or any other type of data.

Computing device 300 includes a presentation interface 320 that is coupled to processor 315. Presentation interface 320 presents information, as described in further detail below, to a user 325. For example, presentation interface 320 may include a display adapter (not shown) that may be coupled to a display device, such as a cathode ray tube (CRT), a liquid crystal display (LCD), an organic LED (OLED) display, and/or an "electronic ink" display. In some embodiments, presentation interface 320 includes one or more display devices.

In the exemplary embodiment, computing device 300 includes a user input interface 335. In the exemplary embodiment, user input interface 335 is coupled to processor 315 and receives input from user 325. User input interface 335 may include, for example, a keyboard, a pointing device, a mouse, a stylus, a touch sensitive panel (e.g., a touch pad or a touch screen), a gyroscope, an accelerometer, a position detector, and/or an audio user input interface. A single component, such as a touch screen, may function as both a display device of presentation interface 320 and user input interface 335.

Computing device 300 includes a communication interface 340 coupled to processor 315 in the exemplary embodiment. Communication interface 340 communicates with one or more remote devices. To communicate with remote devices, communication interface 340 may include, for example, a wired network adapter, a wireless network adapter, and/or a mobile telecommunications adapter.

In the exemplary embodiment, blade pass data is received from sensors 160 by communication interface 340 and stored in memory device 310. Utilizing user input interface 335, user 325 can select and display blade pass data on presentation interface 320, as described in detail below.

Figure 4:
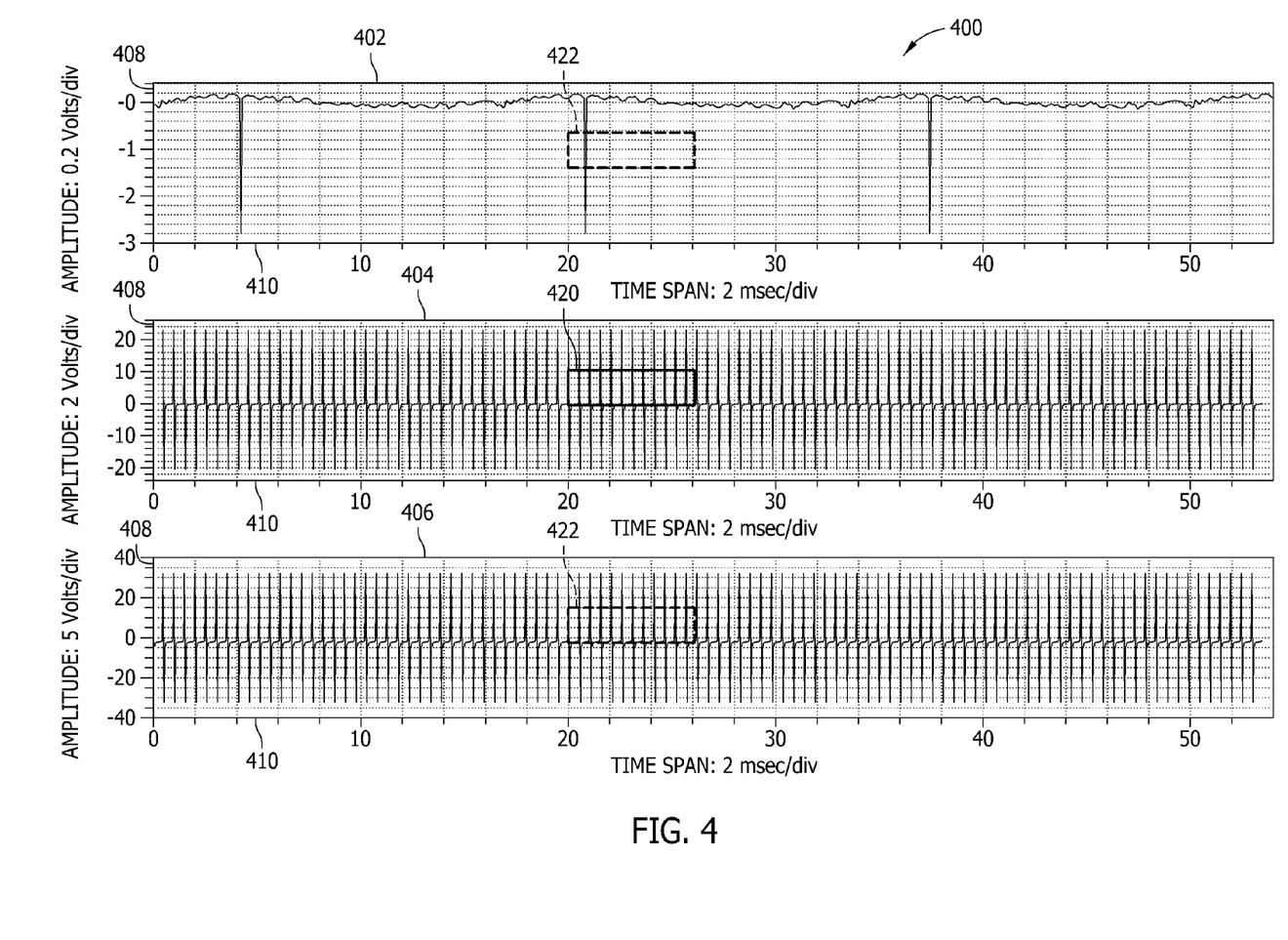
FIG. 4 is a screenshot of exemplary blade pass data that may be displayed on the presentation interface of the computing device shown in FIG. 3.

FIG. 4 is a screenshot 400 of exemplary blade pass data that may be displayed on presentation interface 320 of computing device 300 (both shown in FIG. 3). By observing and analyzing blade pass data, a user, such as user 325 (shown in FIG. 3) can detect potential problems in compressor assembly 114. For example, if a voltage pulse for a particular compressor blade 134 in blade pass data is absent and/or has an anomalous height, user 325 can determine there is a potential problem with compressor blade 134. Notably, while screenshot 400 includes blade pass data, alternatively, the data displayed on presentation interface 320 may be any suitable data, including other turbine engine data or data unrelated to turbine engine applications.

In the exemplary embodiment, the blade pass data in screenshot 400 includes a keyphasor sensor plot 402, a primary blade pass sensor plot 404, and a secondary blade pass sensor plot 406 for a particular stage 138. Keyphasor sensor plot 402 includes blade pass data from a keyphasor sensor of sensors 160, primary blade pass sensor plot 404 includes blade pass data from a primary blade pass sensor of sensors 160, and secondary blade pass sensor plot 406 includes blade pass data from a secondary blade pass sensor of sensors 160. Alternatively, screenshot 400 includes plots and/or data that enables computing device 300 to function as described herein.

Each of keyphasor sensor plot 402, primary blade pass sensor plot 406, and secondary blade pass sensor plot 406 plot a voltage signal of the respective sensor on a Y-axis 408 against time on an X-axis 410. In the exemplary embodiment, each plot 402, 404, and 406 has a different scale on the Y-axis 408, but all plots 402, 404, and 406 have the same scale on the X-axis 410. Alternatively, plots 402, 404, and 406 have any Y-axis and X-axis scales that enable computing device 300 to function as described herein.

To better view blade pass data, it may be advantageous for user 325 to zoom in on a particular portion of keyphasor sensor plot 402, primary blade pass sensor plot 404, and/or secondary blade pass sensor plot 406. To zoom in on a particular portion, user 325 utilizes user input interface 335 (shown in FIG. 3) to create a zoom window 420. In one embodiment, user 325 creates zoom window 420 by clicking and dragging a cursor to create window 420 using a mouse. In another embodiment, user 325 selects a point on keyphasor sensor plot 402, primary blade pass sensor plot 404, or secondary blade pass sensor plot 406, and selects a zoom magnification on a magnification bar. Alternatively, zoom window 420 may be created using any suitable method that enables computing device 300 to function as described herein.

Figure 5:
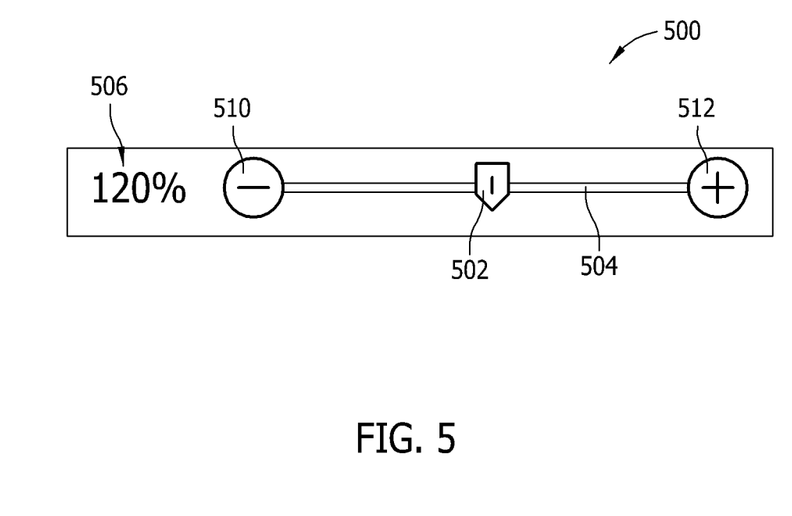
FIG. 5 is an image of an exemplary magnification bar that may be used to create the zoom window shown in FIG. 4.

FIG. 5 is an image of an exemplary magnification bar 500 that may be used to create zoom window 420 (shown in FIG. 4). In one embodiment, magnification bar 500 is displayed on presentation interface 320 after user 325 selects a point on keyphasor sensor plot 402, primary blade pass sensor plot 404, or secondary blade pass sensor plot 406 to zoom in on. Magnification bar 500 includes a slider 502 that may be adjusted along a range 504 to increase and/or decrease a zoom magnification (i.e., increase and decrease the size of zoom window 420). A magnification identifier 506 displays the currently selected zoom magnification ("120%" in FIG. 5). To adjust the zoom magnification, user 325 can select a magnification decrease button 510 or a magnification increase button 512 to decrease or increase, respectively, the zoom magnification. User 325 may also click and drag slider 502 along range 504 using a mouse.

Referring again to FIG. 4, based on zoom window 420 created in one of keyphasor sensor plot 402, primary blade pass sensor plot 404, or secondary blade pass sensor plot 406, processor 315 (shown in FIG. 3) automatically determines a corresponding zoom window 422 in the remaining plots. For example, as shown in FIG. 4, user creates zoom window 420 on primary blade pass sensor plot 404. Accordingly, processor 315 automatically determines corresponding zoom windows 422 for keyphasor sensor plot 402 and secondary blade pass sensor plot 406. In the exemplary embodiment, corresponding zoom windows 422 are displayed on presentation interface 320. Alternatively, corresponding zoom windows 422 are still automatically determined by processor 315, but are not displayed on presentation interface 320.

As shown in FIG. 4, in the exemplary embodiment, corresponding zoom windows 422 have the same size and are located at the same relative position within their respective plots as zoom window 420 in keyphasor sensor plot 402. Accordingly, related data can be easily compared by simultaneously viewing data in zoom window 420 and corresponding zoom windows 422.

Figure 6:
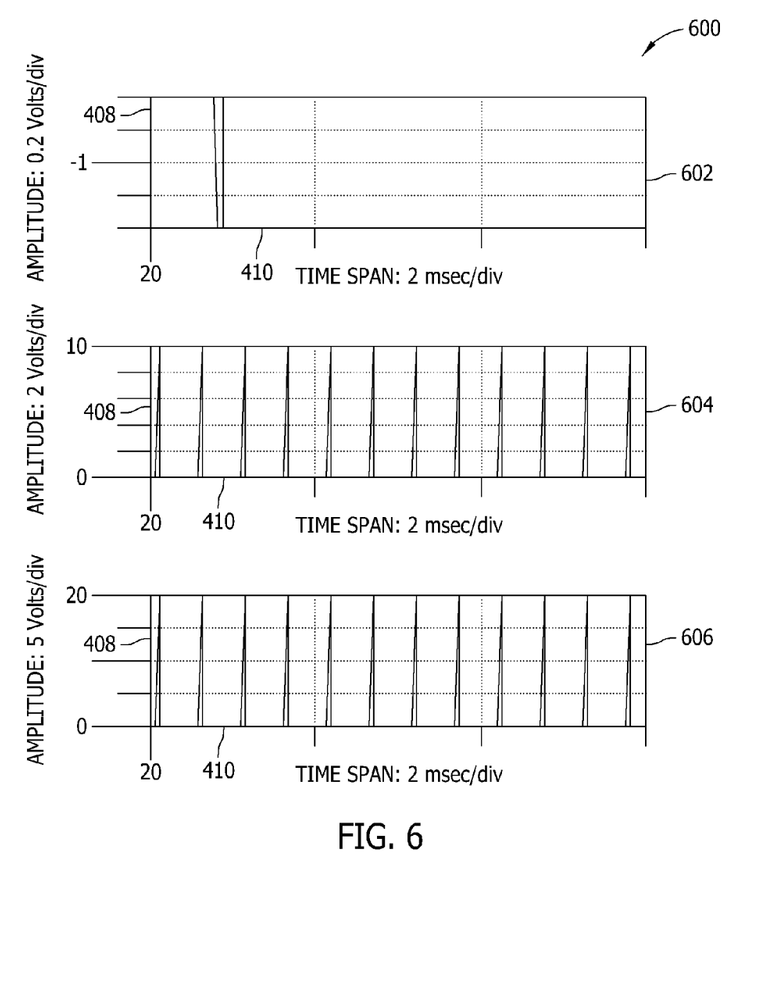
FIG. 6 is a screenshot of exemplary zoomed-in blade pass data that may be displayed on the presentation interface of the computing device shown in FIG. 3.

FIG. 6 is an exemplary screenshot 600 of zoomed-in blade pass data that may be displayed on presentation interface 320 (shown in FIG. 3). As shown in FIG. 6, once user 325 creates zoom window 420, processor 315 causes presentation interface 320 to automatically display a zoomed-in keyphasor sensor plot 602, a zoomed-in primary blade pass sensor plot 604, and a zoomed-in secondary blade pass sensor plot 606. Zoomed-in keyphasor sensor plot 602 corresponds to corresponding zoom window 422 of keyphasor sensor plot 402, zoomed-in primary blade pass sensor plot 604 corresponds to zoom window 420 of primary blade pass sensor plot 404, and zoomed-in secondary blade pass sensor plot 606 corresponds to corresponding zoom window 422 of secondary blade pass sensor plot 406. That is, keyphasor sensor plot 402, primary blade pass sensor plot 404, and secondary blade pass sensor plot 406 are synchronously zoomed based on zoom window 420.

Accordingly, based on user-created zoom window 420 in a selected plot, presentation interface 320 simultaneously displays a zoomed-in area of the selected plot along with corresponding zoomed-in areas of the remaining plots. This enables user 325 to quickly and easily compare blade sensor data in keyphasor sensor plot 402, primary blade pass sensor plot 404, and secondary blade pass sensor plot 406.

In the exemplary embodiment, zoom window 420 increases magnification along both X-axis 410 and Y-axis 408. Alternatively, depending on the dimensions of zoom window 420, zoom window 420 may increases magnification only along one of X-axis and Y-axis. Further, to aid in comparing blade pass data, in the exemplary embodiment, all of the zoomed-in plots have the same scale for at least one of Y-axis 408 and X-axis 410. For example, in FIG. 6, zoomed-in keyphasor sensor plot 602, zoomed-in primary blade pass sensor plot 604, and zoomed-in secondary blade pass sensor plot 606 have the same scale along X-axis 410 but a different scale along Y-axis 408. Alternatively, zoomed-in plots 602, 604, and 606 may have any suitable scale.

Figure 7:
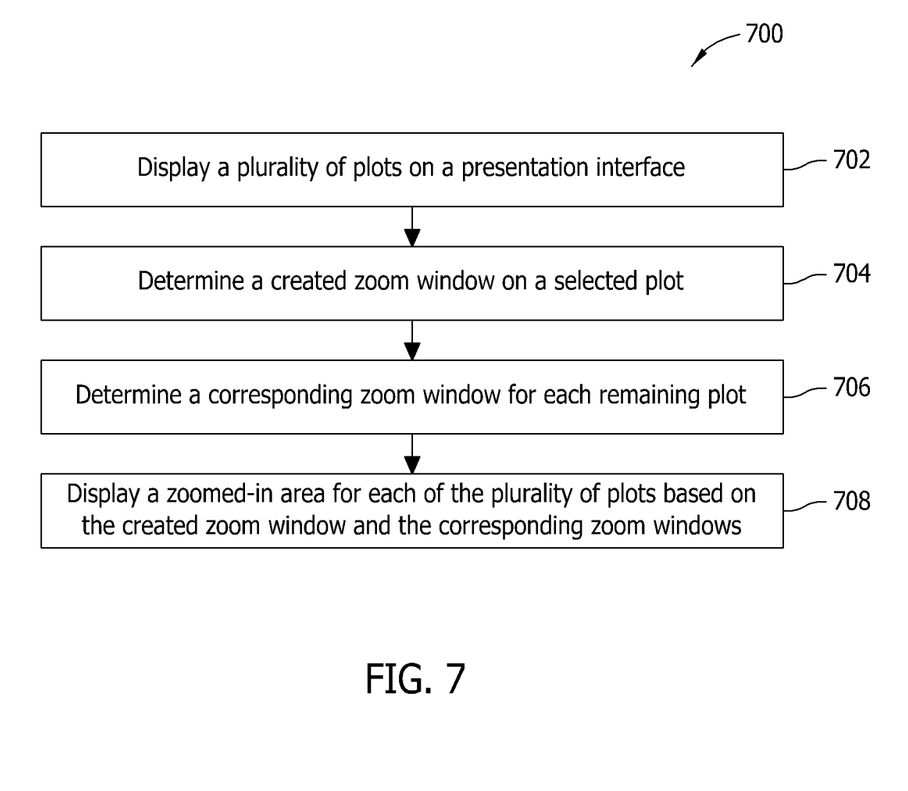
FIG. 7 is a flowchart of an exemplary method that may be implemented to display a plurality of plots simultaneously.

FIG. 7 is a flowchart of an exemplary method 700 that may be implemented to display a plurality of plots simultaneously. In the exemplary embodiment, a plurality of plots are displayed 702 on a presentation interface, such as plots 402, 404, and 406 (shown in FIG. 4) on presentation interface 320 (shown in FIG. 3). A processing device, such as processor 315 (shown in FIG. 3), determines 704 a created zoom window, such as zoom window 420 (shown in FIG. 4) on a selected plot of the plurality of plots. The created zoom window may be created in response to user input, as described above.

Based on the created zoom window, the processing device automatically determines 706 a corresponding zoom window for each remaining plot, such as corresponding zoom windows 422 (shown in FIG. 4) for plots 402 and 406. Using the created zoom window and the corresponding zoom window, a zoomed-in area, such as zoomed-in plots 602, 604, and 606, is displayed 708 on the presentation interface for each plot.

The embodiments described herein enable a plurality of plots to be accurately and effectively displayed on a presentation interface. By creating a zoom window on a selected plot of the plurality of plots, a corresponding zoom window is automatically generated for each of the remaining plots. Using the created zoom window and the corresponding zoom windows, a zoomed-in area of the selected plot is displayed, as well as zoomed-in areas for each of the remaining plots. Simultaneously displaying a zoomed-in area for each of the plurality of plots on the presentation interface enables a user to quickly and easily compare data between the different plots.

As compared to at least some data display systems, the systems and methods described herein enable simultaneously displaying a zoomed-in area on a plurality of plots. That is, at least some known data display systems, different plots of data are displayed at different scales, and the different plots cannot be easily compared. In contrast, the systems and methods described herein enable displaying data from a plurality of plots at the same scale along at least one axis. Moreover, in at least some known data display systems, zooming in on a selected data plot only magnifies that particular plot. In contrast, using the systems and methods described herein, based on a zoom window created for a selected plot, corresponding zoom windows are automatically created for remaining plots, and a zoomed-in area for each plot is displayed simultaneously.

The methods and systems described herein are not limited to the specific embodiments described herein. For example, components of each system and/or steps of each method may be used and/or practiced independently and separately from other components and/or steps described herein. In addition, each component and/or step may also be used and/or practiced with other systems, apparatus, and methods. For example, the data in the plurality of plots is not limited to compressor assembly blade pass data, but may include blade vibration data, or even data unrelated to the operation of a gas turbine engine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

While the invention has been described in terms of various specific embodiments, those skilled in the art will recognize that the invention may be practiced with modification within the spirit and scope of the claims.

What is claimed is:

1. A system for displaying a plurality of plots, the system comprising:
   a presentation interface configured to display the plurality of plots;
   a user input interface configured to create a zoom window on a selected plot of the plurality of plots, wherein the zoom window displays a visual indication of a zoom area to be zoomed in upon in the selected plot; and
   a processing device configured to:
      determine automatically, based at least in part on the created zoom window, a corresponding zoom window for each remaining plot of the plurality of plots; and
      cause a simultaneous display, on the presentation interface, of the corresponding zoom window in each of the remaining plots.

2. The system of claim 1, wherein the user input interface is configured to create a zoom window in response to a user clicking and dragging a cursor.

3. The system of claim 1, wherein the user input interface is configured to create the zoom window in response to a user selecting a point on the selected plot and selecting a zoom magnification.

4. The system of claim 1, wherein the processing device is configured to determine automatically the corresponding zoom window that is located at the same relative position within each remaining plot as the created zoom window in the selected plot.

5. The system of claim 1, wherein the processing device is configured to cause a display of zoomed-in areas for each of the plurality of plots based at least in part on the created zoom window.

6. The system of claim 1, wherein the zoom window comprises a solid line.

7. The system of claim 1, wherein the corresponding zoom windows comprise a dashed line.

8. A processing device configured to:
   cause a display a plurality of plots on a presentation interface;
   determine and cause the display of, based on user input, a created zoom window on a selected plot of the plurality of plots, wherein the zoom window displays a visual indication of a zoom area to be zoomed in upon in the selected plot;
   determine automatically, based on the created zoom window, a corresponding zoom window for each remaining plot of the plurality of plots; and
   cause a simultaneous display, on the presentation interface, of the corresponding zoom window in each of the remaining plots.

9. The processing device of claim 8, wherein the created zoom window is created in response to a user clicking and dragging a cursor.

10. The processing device of claim 8, wherein the created zoom window is created in response to a user selecting a point on the selected plot and selecting a zoom magnification.

11. The processing device of claim 8, wherein the processing device is configured to determine automatically a corresponding zoom window that is located at the same relative position within each remaining plot as the created zoom window in the selected plot.

12. The processing device of claim 8, wherein the processing device is configured to cause a display of zoomed-in areas for each of the plurality of plots based at least in part on the created zoom window.

13. The processing device of claim 8, wherein the zoom window comprises a solid line.

14. The processing device of claim 8, wherein the corresponding zoom windows comprise a dashed line.

15. A method for displaying a plurality of plots, the method comprising:
   displaying a plurality of plots on a presentation interface;
   determining and causing the display of, using a processing device, a created zoom window on a selected plot of the plurality of plots, wherein the zoom window displays a visual indication of a zoom area to be zoomed in upon in the selected plot;

determining automatically, using the processing device, based on the created zoom window, a corresponding zoom window for each remaining plot of the plurality of plots; and displaying simultaneously, on the presentation interface, the corresponding zoom window in each of the remaining plots.

16. The method of claim 15, wherein determining a created zoom window comprises determining a created zoom window based on a user clicking and dragging a cursor.

17. The method of claim 15, wherein determining a created zoom window comprises determining a created zoom window based on a user selecting a point on the selected plot and selecting a zoom magnification.

18. The method of claim 15, wherein comprising displaying zoomed-in areas for each of the plurality of plots based at least in part on the created zoom window.

19. The method of claim 15, wherein the zoom window comprises a solid line.

20. The method of claim 15, wherein the corresponding zoom windows comprise a dashed line.

* * * * *